US009626381B2

(12) United States Patent
De Armas

(10) Patent No.: US 9,626,381 B2
(45) Date of Patent: Apr. 18, 2017

(54) PHOTO ALBUM CREATION BASED ON SOCIAL MEDIA CONTENT

(75) Inventor: Mario Ernesto De Armas, Wellington, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 13/526,758

(22) Filed: Jun. 19, 2012

(65) Prior Publication Data
US 2013/0339435 A1    Dec. 19, 2013

(51) Int. Cl.
G06F 17/30    (2006.01)
G06F 17/24    (2006.01)
G06F 3/0481   (2013.01)
G06F 3/048    (2013.01)
G06F 3/0484   (2013.01)

(52) U.S. Cl.
CPC ...... G06F 17/30274 (2013.01); G06F 3/048 (2013.01); G06F 3/0481 (2013.01); G06F 3/0484 (2013.01); G06F 17/241 (2013.01); G06F 17/30038 (2013.01); G06F 17/30268 (2013.01)

(58) Field of Classification Search
CPC ........... G06F 17/241; G06F 17/300038; G06F 17/30268; G06F 3/048; G06F 3/0481; G06F 3/0484; G06F 17/30528; G06F 17/30247; G06F 17/30265; G06F 17/30038; G06K 9/00221; G06K 9/00677; G06K 9/00671; G06Q 30/06; G06Q 30/02; G06T 11/60; G06G 3/048; G06G 3/0481; G06G 3/0484

USPC ......... 715/205, 764, 849; 711/103; 382/100; 705/14.58; 709/204, 231; 707/737
See application file for complete search history.

(56) References Cited

U.S. PATENT DOCUMENTS

| 8,327,012 | B1 * | 12/2012 | Nguyen et al. ............... 709/231 |
| 2006/0041591 | A1 | 2/2006 | Rhoads |
| 2010/0063961 | A1 * | 3/2010 | Guiheneuf ........ G06F 17/30265 707/622 |
| 2010/0235312 | A1 | 9/2010 | McCullough et al. |
| 2011/0013226 | A1 | 1/2011 | Grosz et al. |
| 2011/0182485 | A1 * | 7/2011 | Shochat et al. .............. 382/118 |
| 2011/0202822 | A1 * | 8/2011 | Zuckerberg et al. ......... 715/205 |
| 2011/0213795 | A1 | 9/2011 | Lee et al. |
| 2011/0246502 | A1 | 10/2011 | Aguera y Arcas |
| 2011/0314208 | A1 * | 12/2011 | Feinberg et al. ............. 711/103 |

(Continued)

FOREIGN PATENT DOCUMENTS

CN    102067127 A    5/2011

OTHER PUBLICATIONS

Sophonet—Perception, Sharing and Demonstration of Social Photograph based on Participatory Perception; May 31, 2012.

*Primary Examiner* — Le H Luu
(74) *Attorney, Agent, or Firm* — Steven L. Nichols; Fabian VanCott

(57) ABSTRACT

A method of creating a physical representation of digital information located on a social networking environment comprises retrieving a number of digital images from the social networking environment, retrieving data associated with the digital images, and creating a physical representation of the digital images and data associated with the digital images, in which the data associated with the digital images comprises information about the subject matter of the digital images.

20 Claims, 6 Drawing Sheets

(56) References Cited

U.S. PATENT DOCUMENTS

| | | | |
|---|---|---|---|
| 2012/0076427 A1* | 3/2012 | Hibino | G06K 9/00671 382/218 |
| 2012/0215771 A1* | 8/2012 | Steiner | 707/723 |
| 2012/0250950 A1* | 10/2012 | Papakipos et al. | 382/118 |
| 2012/0265758 A1* | 10/2012 | Han et al. | 707/737 |
| 2012/0281911 A1* | 11/2012 | Fung | 382/165 |
| 2012/0300974 A1* | 11/2012 | Rodriguez | 382/100 |
| 2013/0073995 A1* | 3/2013 | Piantino et al. | 715/764 |
| 2013/0110631 A1* | 5/2013 | Mitchell et al. | 705/14.58 |
| 2013/0191708 A1* | 7/2013 | Song | G06Q 30/06 715/202 |
| 2013/0198261 A1* | 8/2013 | Matas | G06T 11/60 709/203 |
| 2013/0226711 A1* | 8/2013 | Wu | G06Q 30/02 705/14.69 |
| 2013/0227494 A1* | 8/2013 | Matas et al. | 715/849 |
| 2013/0339435 A1* | 12/2013 | De Armas | 709/204 |

* cited by examiner

PHOTO ALBUM CREATION BASED ON SOCIAL MEDIA CONTENT

BACKGROUND

The present disclosure relates to photo album creation, and more specifically, to photo album creation using digital information located on and retrieved from a social networking environment.

SUMMARY

According to one embodiment of the present invention, a method of creating a physical representation of digital information located on a social networking environment is disclosed. The method comprises retrieving a number of digital images from the social networking environment, retrieving data associated with the digital images, and creating a physical representation of the digital images and data associated with the digital images, in which the data associated with the digital images comprises information about the subject matter of the digital images.

According to another embodiment of the present invention, a computer program product for creating a physical representation of digital information located on a social networking environment is disclosed. The computer program product comprises a computer readable storage medium comprising computer usable program code embodied therewith, the computer usable program code. The computer readable storage medium comprises computer usable program code to, when executed by a processor, retrieve a number of digital images from the social networking environment, computer usable program code to, when executed by a processor, retrieve data associated with the digital images, and computer usable program code to, when executed by a processor, create a physical representation of the digital images and data associated with the digital images, the data associated with the digital images comprising information about the subject matter of the digital images.

According to still another embodiment of the present invention, a network for creating a physical representation of digital information located on a social networking environment is disclosed. The network comprises a number of computer system servers comprising a processing unit and a memory, the memory storing a number of digital images and data associated with the digital images presented within the social networking environment. The processing unit retrieves the digital images from the social networking environment, retrieves the data associated with the digital images, and creates the physical representation of the digital images and data associated with the digital images, the data associated with the digital images comprising information about the subject matter of the digital images.

According to still another embodiment of the present invention, a method of creating a photo album. The method comprises retrieving data associated with a number of digital images digital images located on a social networking environment, editing the data associated with the digital images, and creating a photo album comprising the digital images and data associated with the digital images.

BRIEF DESCRIPTION OF THE SEVERAL VIEWS OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
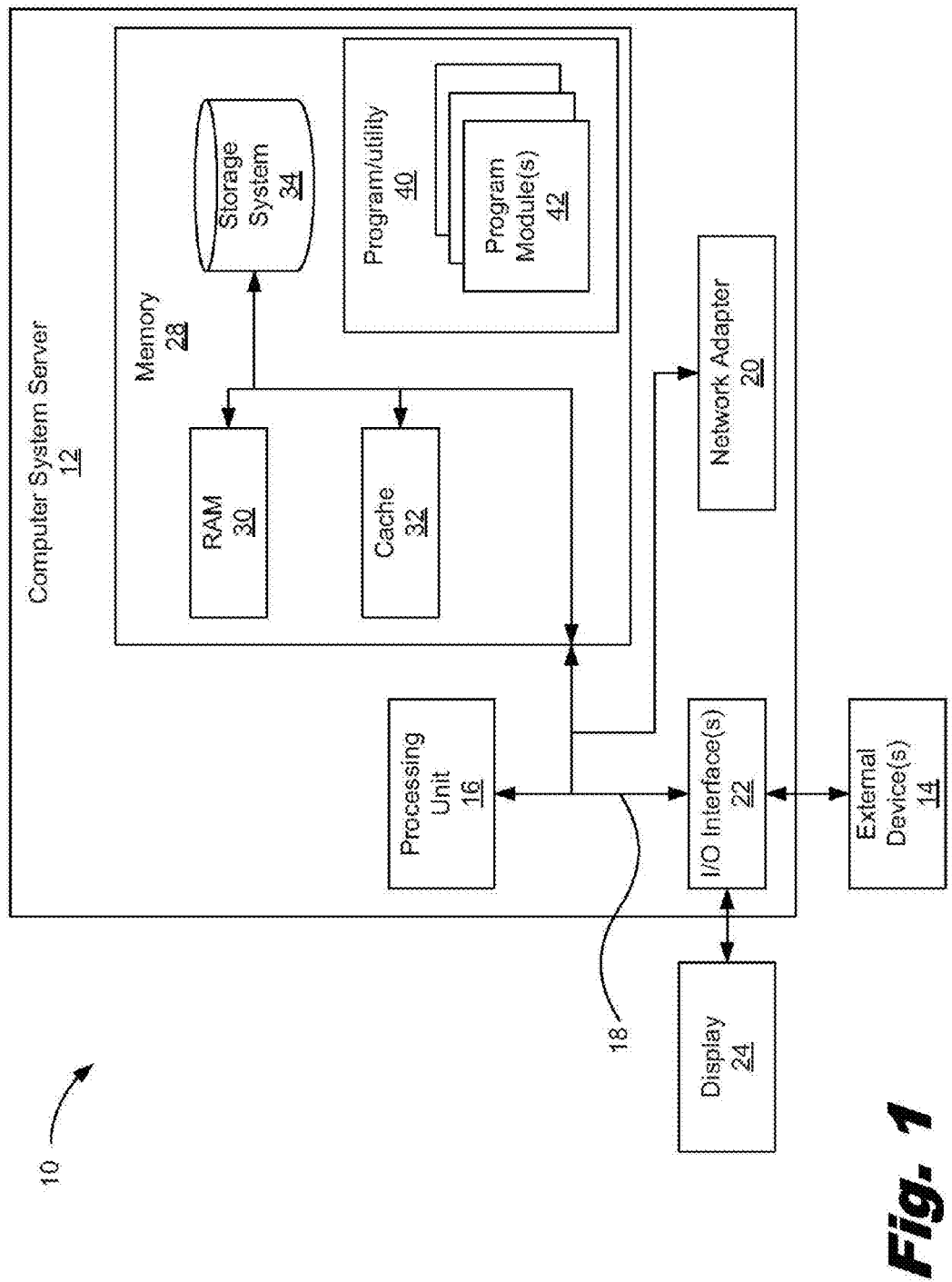
FIG. 1 is a diagram of a cloud computing node, according to one example of principles described herein.

In the present age of social networks and always-on internet access, methods to capture, share, and preserve personal media such as physical photo album creation has decreased in popularity. In part, it may be true that the method of printing photos and flipping trough a physical album is foreign to younger generations. However, it may be asserted that on-line does not mean "always available," that digital content can be volatile, and social networking services such as CompuServe™, AOL™, MySpace™ and Facebook™ may change over time and are not perennial. Therefore, the need for physical and tangible media will always be apparent. This may be especially realized in off-line situations when interacting with older relatives, with privacy-minded friends who refuse to join social networks, and other groups and individuals, and when acknowledging the need for long-term preservation of media in the form of backups, or when removing social accounts such as when individuals die and family members wish to preserve their relative's on-line digital media "legacy". This digital media may often include photo albums with comments from friends and family. Preservation of online media may become more and more apparent as social networking and media sites mature and applications have to address the above needs. The present disclosure proposes an automated system and method to transfer that photographic album content from digital form to physical form.

Specifically, the present system and methods allow for an automated method to transfer photographic media collections from social network websites to a physical medium such as physical photos while preserving the social characteristics of the photo album captured during the on-line social experience.

As used in the present specification and in the appended claims, the term "social networking environment" or similar language is meant to be understood broadly as any community digitally represented within a network where users interact with and share content (such as blogs, photos, videos, documents, music, etc). In one example, the users may have similar interests, needs, and goals, and may interact, make connections, and collaborate. One example of a social networking environment may be Facebook™ located at www.facebook.com. This socialization process can enhance greatly the shared content itself as to create a unique experience and outcome that is only captured within the social networking environment.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

It is understood in advance that although this disclosure includes a detailed description on cloud computing, implementation of the teachings recited herein are not limited to a cloud computing environment. Rather, examples of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a diagram of a cloud computing node, according to one example of principles described herein is shown. Cloud computing node (10) is only one example of a suitable cloud computing node and is not intended to suggest any limitation as to the scope of use or functionality of examples of the system described herein. Regardless, cloud computing node (10) is capable of being implemented and/or performing any of the functionality set forth hereinabove.

In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, a number of processors or processing units (16), a system memory (28), and a bus (18) that couples various system components including system memory (28) to processor (16).

Bus (18) represents a number of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server (12) includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by a number of data media interfaces. As will be further depicted and described below, memory (28) may include at least one program product having a set (e.g., at least one) of program modules to carry out the functions of examples of the present disclosure.

Program/utility (40), having a set (at least one) of program modules (42), may be stored in memory (28) by way of example, and not limitation, as well as an operating system, a number of application programs, other program modules, and program data. Each of the operating system, a number of application programs, other program modules, and program data or some combination thereof, may include an implementation of a networking environment. Program modules (42) generally carry out the functions and/or methodologies of examples of the system as described herein.

Computer system/server (12) may also communicate with a number of external devices (14) such as a keyboard, a pointing device, a display (24), etc.; a number of devices that enable a user to interact with computer system/server (12); and/or any devices (e.g., network card, modem, etc.) that enable computer system/server (12) to communicate with a number of other computing devices. Such communication can occur via Input/Output (I/O) interfaces (22). Still yet, computer system/server (12) can communicate with a number of networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

In one example, the external devices (14) may comprise a printing device for printing a number of physical representations of digital images and data associated with the digital images. In this example, the printing device (14) is able to print a photo album or other physical representation of the digital images and data associated with the digital images.

Figure 2:
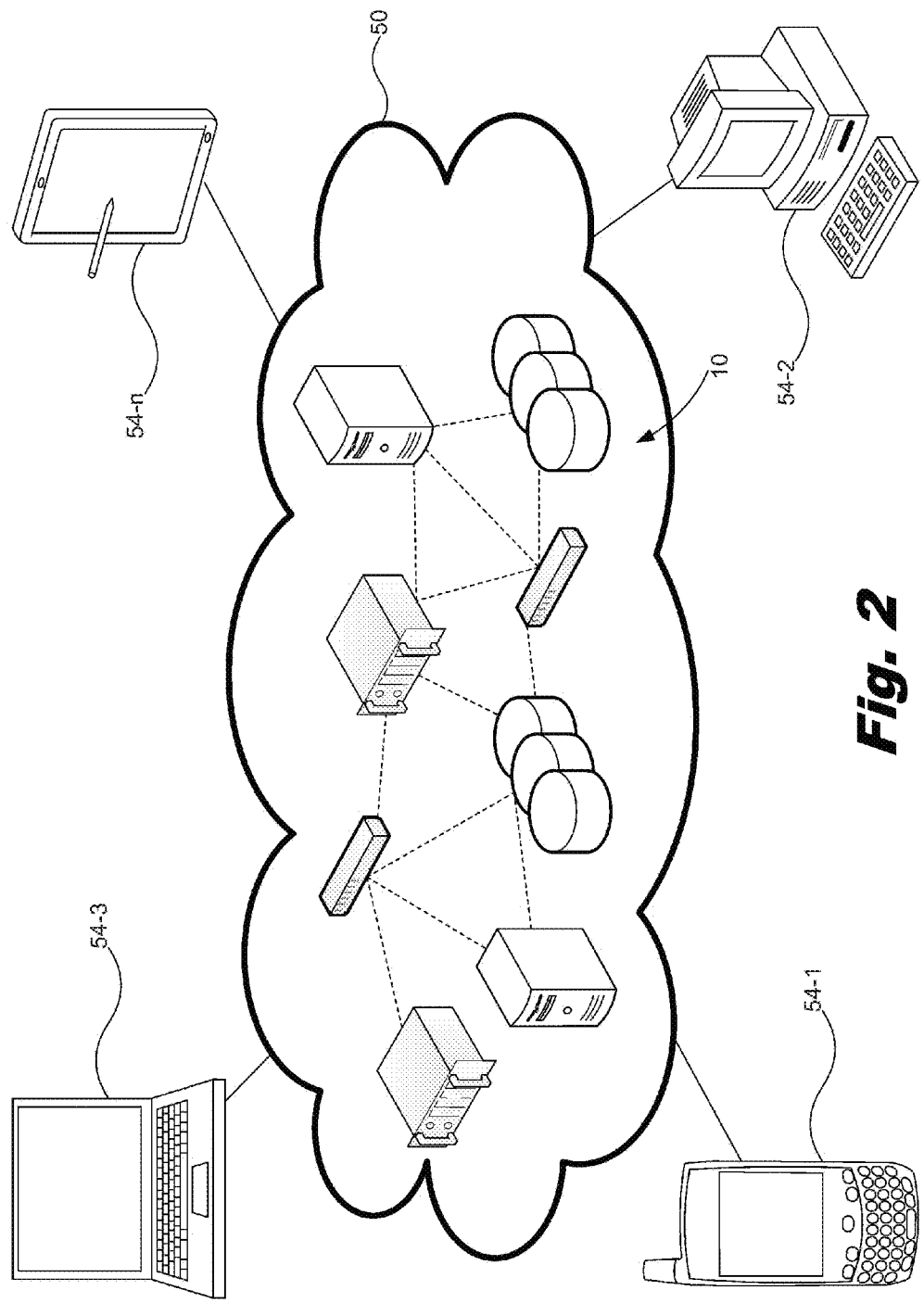
FIG. 2 is a diagram of a cloud computing environment, according to one example of principles described herein.

Referring now to FIG. 2, a diagram of a cloud computing environment (50), according to one example of principles described herein is depicted. As shown, cloud computing environment (50) comprises a number of cloud computing nodes (10) with which local computing devices used by cloud consumers, such as, for example, personal digital assistant (PDA) or cellular telephone (54-1), desktop computer (54-2), laptop computer (54-3) and/or any number or type of other local computing devices (54-n) may communicate. Nodes (10) may communicate with one another. They may be grouped (not shown) physically or virtually, in a number of networks, such as Private, Community, Public, or Hybrid clouds as described hereinabove, or a combination thereof. This allows cloud computing environment (50) to offer infrastructure, platforms, and/or software as services for which a cloud consumer does not need to maintain resources on a local computing device. The types of computing devices (54-1) through (54-n) shown in FIG. 2 are intended to be an example only and that computing nodes (10) and cloud computing environment (50) can communicate with any type of computerized device over any type of network and/or network addressable connection (e.g., using a web browser).

Figure 3:
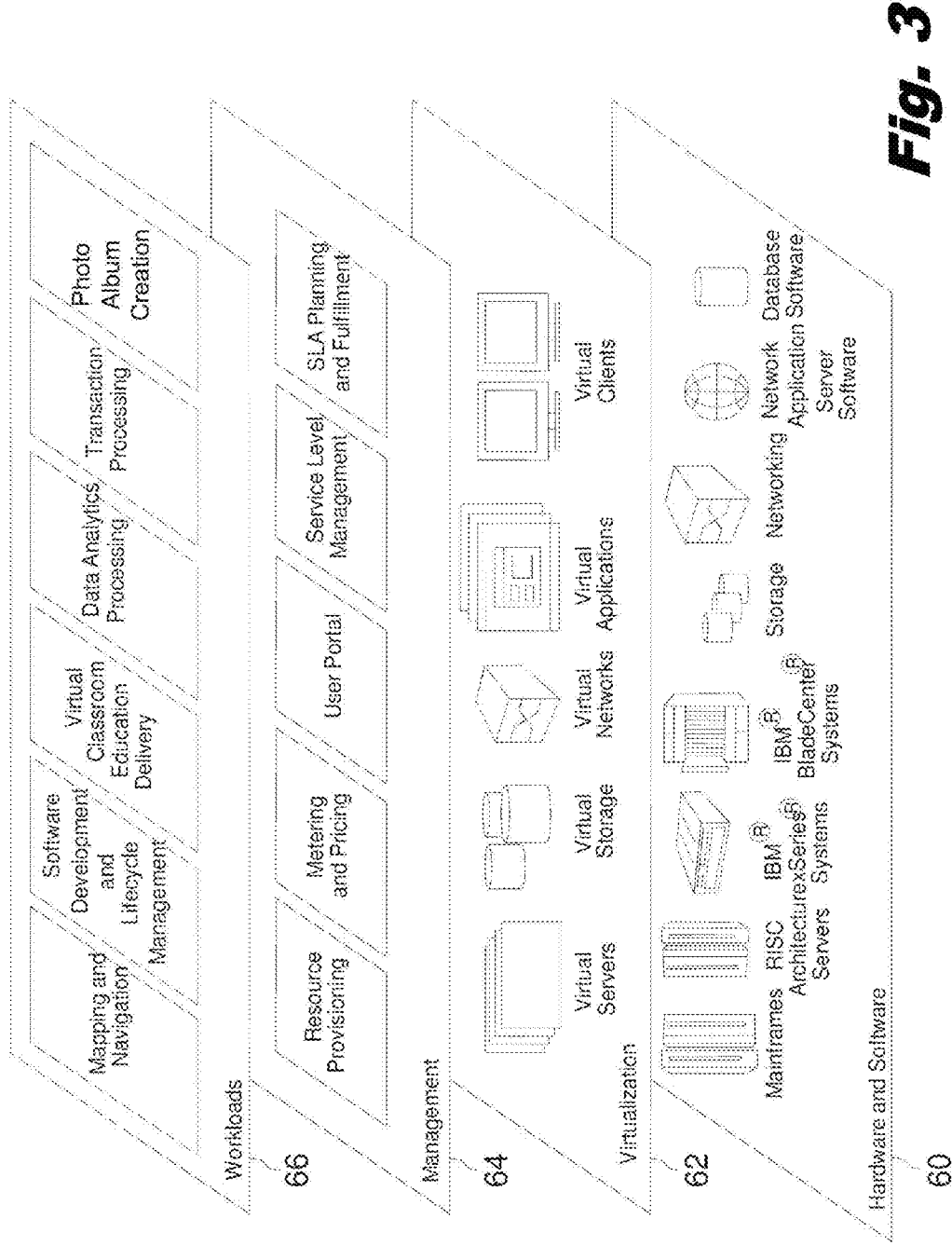
FIG. 3 is a diagram of a set of functional abstraction layers within the cloud computing environment of FIG. 2, according to one example of principles described herein.

Referring now to FIG. 3, a set of functional abstraction layers provided by cloud computing environment (50) (FIG. 2) is shown. It should be understood in advance that the components, layers, and functions shown in FIG. 3 are intended to be an example only and examples of the invention are not limited thereto. As depicted, the following layers and corresponding functions are provided:

Hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software, (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer include: mapping and navigation; software development and lifecycle management; virtual classroom education delivery; data analytics processing; transaction processing; and photo album creation.

The methods described herein may be implemented as an application associated with a social networking environment. For example, the methods described herein may be implemented via an application that is bundled with the social networking environment. In this example, a user may utilize the application if the user has access to the social networking environment. In another example, the methods described herein may be implemented as a mobile application designed to operate on, for example, a smart phone, and which is associated with the social networking environment. In one example, the above applications may be created, and users may use the applications in their respective profiles to automatically purchase the service without manually having to figure out how to preserve the information on paper.

Figure 4:
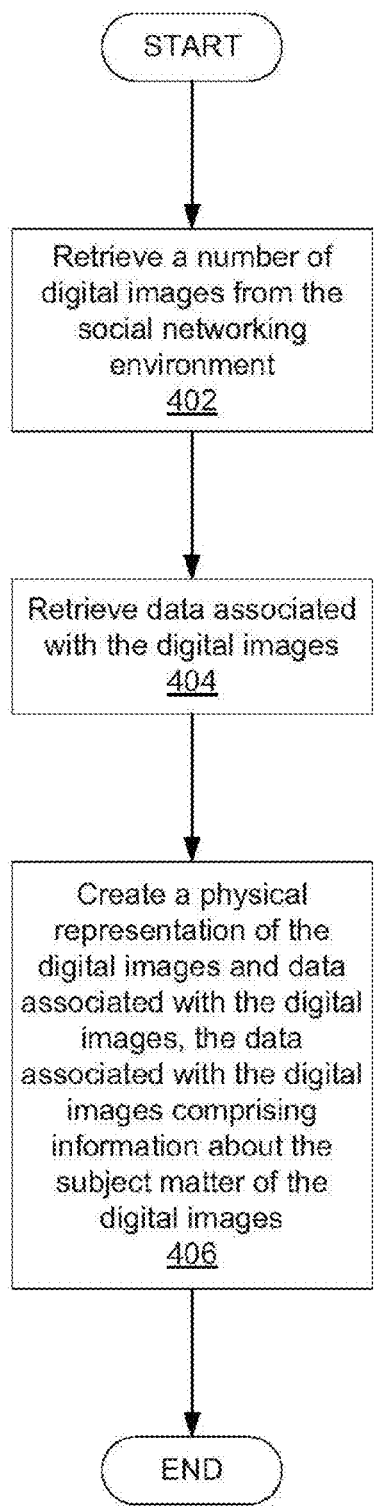
FIG. 4 is a flowchart showing a method of creating a physical representation of digital information located on a social networking environment, according to one example of principles described herein.

FIG. 4 is a flowchart showing a method of creating a physical representation of digital information located on a social networking environment, according to one example of principles described herein. The method described in FIG. 4 may begin by the retrieving (block 402) a number of digital images from a social networking environment. As described above, a social networking environment is any community digitally represented within a network where users interact. One example of a social networking environment may be Facebook™. The cloud computing nodes (10) may serve as the devices within the present disclosure that retrieves the digital images from the social networking environment.

Users may upload images to a social networking website, for example, in order to allow others to view those digital images. Uploading of images may be accomplished through the use of the cellular telephone (54-1), desktop computer (54-2), laptop computer (54-3) and/or any number or type of other local computing devices (54-n). The cloud computing nodes (10) may then store and serve the images for viewing by a number of users. As described herein, those digital images may be used to create a physical representation of the images in the form of, for example, a photo album.

At block 404, the system of the present disclosure retrieves data associated with the digital images. Users of social networking environments, in conjunction with the uploading of the digital images to the social networking website, may also append to or associate other information, data, or metadata with the digital images. In one example, this data associated with the digital images may include, for example, comments about the digital images, the subject matter of the digital images, or the individuals or things portrayed within the digital images. In this example, users may add comments to the social networking environment when images are posted to the social networking environment. These comments may include past, present, and future information about the people within the images, the subject matter of the images, context or stories about the image, when the picture was taken, or chronological order of events surrounding the image, among other information.

Further, the data associated with the digital images may also comprise a number of tags. Tags are instances of metadata assigned to a piece of information such as, for example, a digital image that identifies a person or thing within the digital image.

Still another example, the data associated with the digital images may also comprise captions associated with the digital images. When users post digital images to the social networking environment, the user may also append or associate a caption or title that identifies the digital image.

The system of the present disclosure retrieves (block 402, 404) the digital images and data associated with the digital images without altering the digital information located on the social networking environment including, for example, the digital images and data associated with the digital images. In other words, the data representations of the digital images and data associated with the digital images as stored on the memory (28) of the computer system server (12) is not altered during the retrieval of the data from the memory (28) for use in creating the physical representation of the digital images and data associated with the digital images.

The present system creates (block 406) a physical representation of the digital images and data associated with the digital images. The physical representation of the digital images and data associated with the digital images may be in the form of any printed media. For example, the physical representation may be in the form of a photo album.

As described above, the data associated with the digital images comprises information about the subject matter of the digital images, and may be presented within the physical representation along with the digital images. In one example, a user may be allowed select which digital images will be represented within the physical representation. In another example, the user may select which instances and/or forms of data associated with the digital images may be presented within the physical representation of the digital images along with the digital images themselves. For example, the user may wish to not include captions that were associated with the digital images, and, instead, include a number of comments and tags.

In another example, the user may be allowed to customize the layout of the selected digital images and data associated with the digital images within the physical representation thereof. In an example where the physical representation is a photo album, the user may be allowed to adjust the position of the digital images and data associated with the digital images throughout the photo album. In this example, a user may choose to place a number of digital images on a particular page of the photo album, adjust the orientation of the digital images, place a number of captions, comments, tags, or other additional information retrieved from the social networking environment with respect to the digital images.

In another example, the system of the present disclosure may allow a user to edit the data associated with the digital images. For example, if a caption, comment, or tag of the digital image as presented on the social networking environment is inaccurate or if the user wishes to change the caption for any other reason, the user may change that data after it is retrieved (block 404) and before it is printed in the physical representation.

Figure 5:
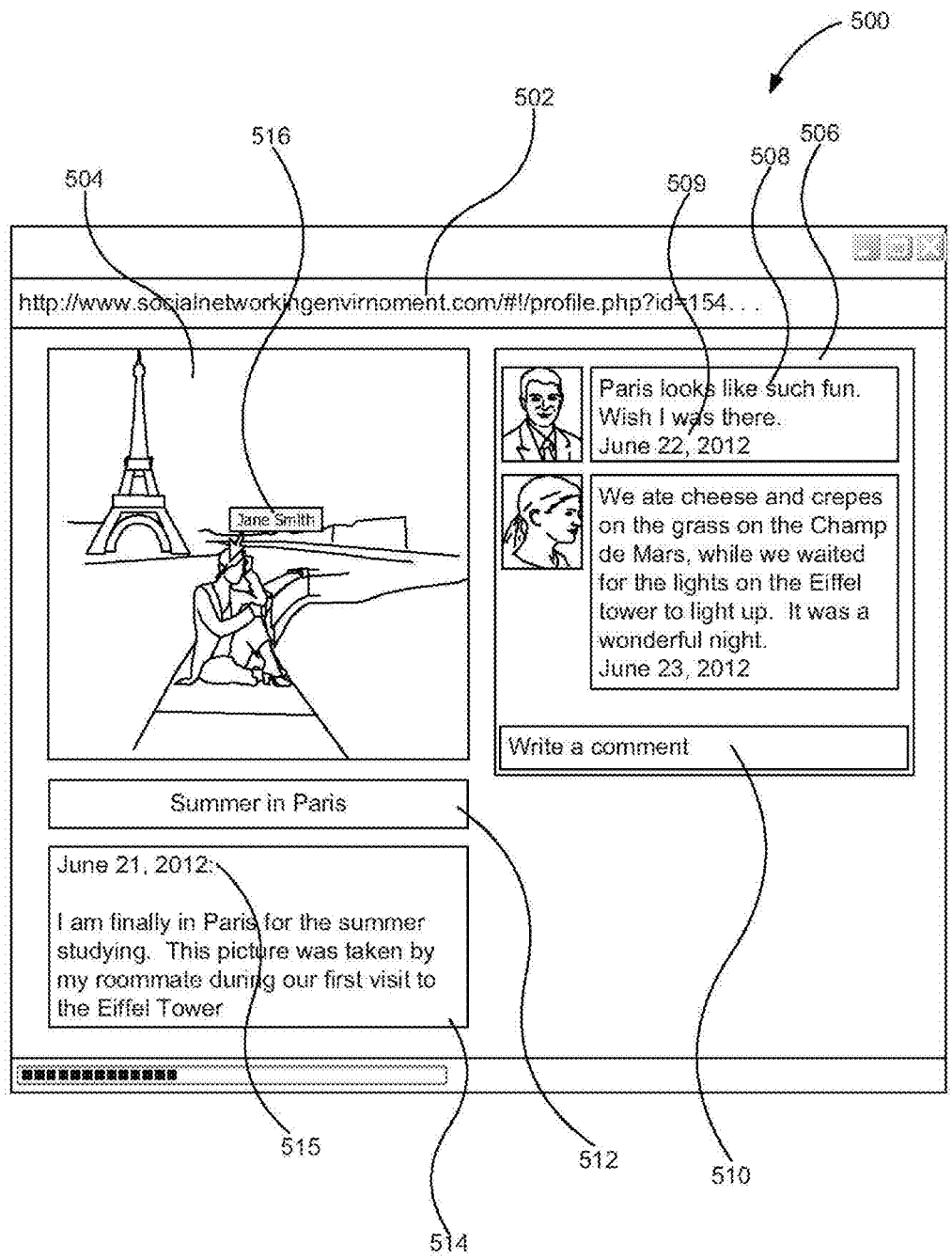
FIG. 5 is a screen shot of a social networking environment, according to an example of the principles described herein.
Figure 6:
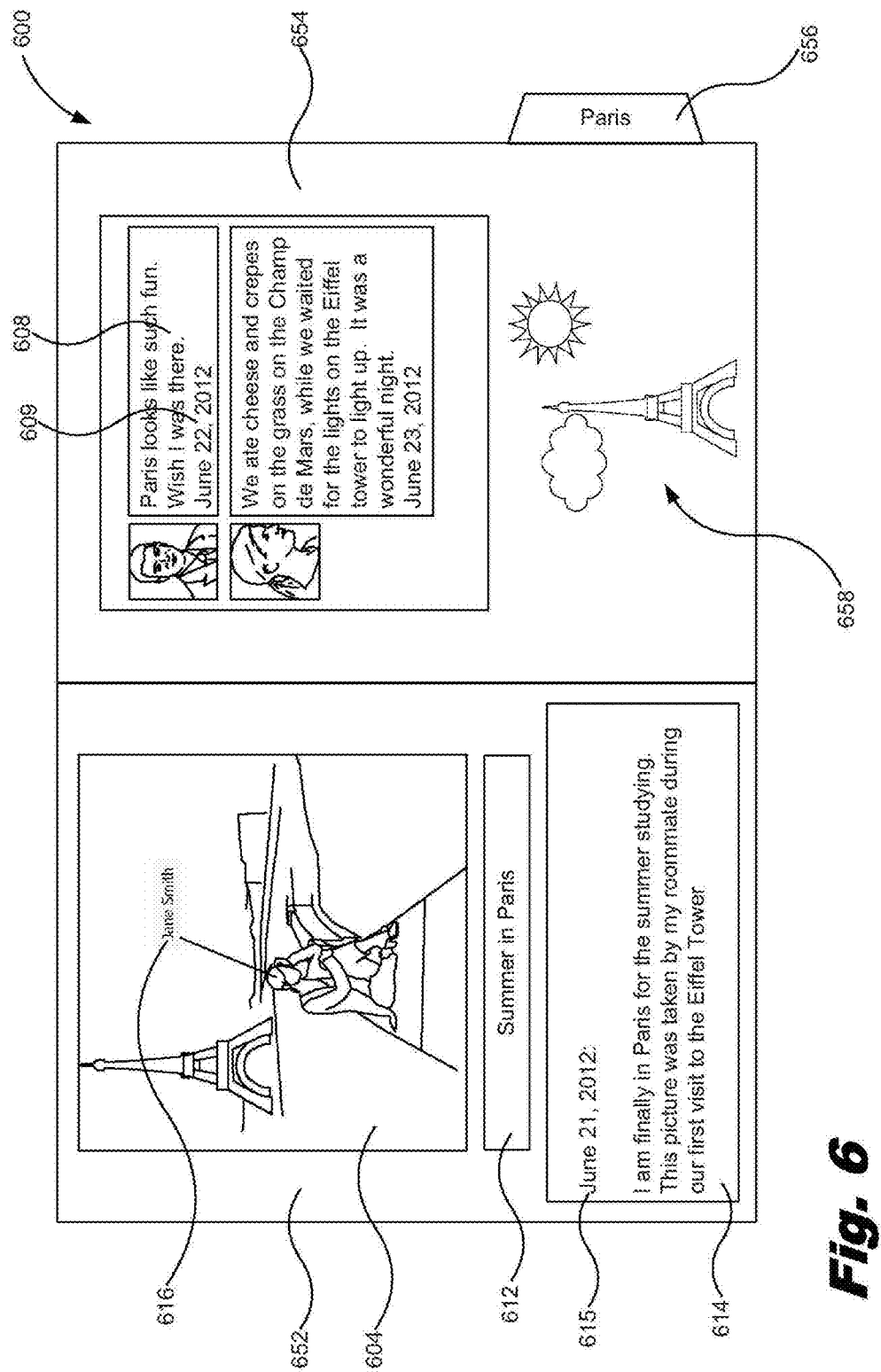
FIG. 6 is a diagram of a physical representation of the social networking environment of FIG. 5, according to an example of the principles described herein.

FIG. 5 is a screen shot of a social networking environment (500), according to an example of the principles described herein. FIG. 6 is a diagram of a physical representation (600) of the social networking environment (500) of FIG. 5, according to an example of the principles described herein. As described above, a number of users may contribute to the information contained within the social networking environment (500), and that information may be retrieved (FIG. 4, block 402, 404) and a physical representation (600) of this information may be created (FIG. 4, block 406). The social networking environment (500) may comprise a universal resource locator (URL) (502) that indicates the particular source from which the digital images and data associated with the digital images may be retrieved.

Specifically, the social networking environment (500) may comprise a number of posted images (504), a comments portion (506) associated with the images (504), a number of captions (512) associated with the images (504), a description (514) of the images (504), and a number of tags (516) associated with the images (504), among others. The image (504) may be presented in any format, and the present system is capable of obtaining the underlying image data for that image (502) in order to print the image on the physical representation (600). The image (504), once the physical representation (600) is created (FIG. 4, 406), can be printed on a page (652, 654) of the physical representation (600) as a printed image (604). Although presented in a specific format or layout in FIG. 6, the various elements of FIG. 6 may be presented in any format or layout.

In one example, throughout the present disclosure the images (504, 604) and comments (508, 608), captions (512, 612), descriptions (514, 614), tags (516, 616), and other data associated with the images (504, 604) may indicate the date on which the image (504, 604) was captured by an image capturing device and/or uploaded to the social networking environment (500). Further, throughout the present disclosure the images (504, 604) and comments (508, 608), captions (512, 612), descriptions (514, 614), tags (516, 616), and other data associated with the images (504, 604) may indicate the location the image (504, 604) was captured by an image capturing device.

In another example, the type and size of font of the various text elements in the physical representation (600) is customizable by the user. In this manner, the user can make comments more personalized, and can select that a different font be assigned to different comment subjects, users, etc. This provides the feel that each person individually "hand-signed" the text element such as comments themselves.

In one example, a user may desire an index-like marker for specifying which photo album within the social networking environment (500) the digital image (504, 604) came from. In this example, the user may choose from a number of indicators that indicate from which album the digital image (504, 604) came from such as, for example, different shaped (rectangle, rounded, diamond, etc) tab markers, different color or font of text associated with the marker label (504, 604).

The comments portion (506) associated with the images (504) within the social networking environment (500) may comprise a number of comments (508) as well as a date (509) the comment was posted. Once retrieved from the social networking environment (500), the data associated with the comments (508) may be printed in the physical representation (600). In the example of FIG. 6, the printed comments (608) may include printed dates (609) that reflect the date (509) the comments (508) were posted to the social networking environment (500). The comments (508, 608) provided by users other than the user who posted the image may provide additional information about that particular image (504, 604) and the circumstances or stories behind the image (504, 604).

The number of comments (508, 608) and which individual comments (508, 608) will be printed in the physical representation (600) may be determined by the user. Additional pages may be added to accommodate for a number of comments (608) that can not be printed on a page (652, 564). In one example, if a user does not want all the comments (508, 608) within the social networking environment (500) to be presented within the physical representation (600), but wants to, instead, limit the comments (508, 608) to specific number of comment sheets, then the user can choose a selection method such as, for example, "most-recent" comments, comments related to a specific group or groups within the social networking environment (500) such as, for example, "Family", "High School Friends", "College Friends", "Sports League Teammates" or "Coworkers," or comments from one or more specific social networking environment (500) users (such as "John Smith", "Mary Jane", etc).

As indicated above, the date and time of comments (508, 608) may also be included based on user's choice. All comment information is automatically retrieved from user's social networking environment (500) account based on the photo album or digital images selected. Further, a user may choose from different color sheets for any additional pages that contain the comments (508, 608), captions (512, 612), descriptions (514, 614), tags (516, 616), and other data associated with the images (504, 604). This may assist a reader in visually identifying which comments are associated with images (504, 604). In another example, the user may select that the additional sheet be a relatively longer or wider depending on page (652, 564) size, layout and spine edge chosen, and that the extra length or width be color coded and include album information of the album from which the digital image (504, 604) was retrieved with details such as album name, date(s), location, and subject matter, among others.

Further, the number of captions (512) associated with the images (504) within the social networking environment (500) may also be printed within the physical representation (600) as a printed caption (612) of the printed image (604). As stated above, the caption (512) may be edited before it is printed within the physical representation (600). FIGS. 5 and 6 depict the image (504, 604) of a scene of the Eiffel Tower in Paris, for example. The associated caption (512, 612)

could provide a short synopsis or title of the image; in the example of FIGS. 5 and 6 that title being "Summer in Paris." In one example, the printed caption (612) may be extracted from a caption filed of a social networking environment (500). In one example, the width of the printed caption (612) as it appears in the physical representation (600) may be equal to the width of the top edge of a page (652, 654). Further, date and time information relating to when the digital image was uploaded to the social networking environment (500) may be presented with the printed caption (612) in the same or different font as the printed caption (612) is presented. In one example, the date and time information may be extracted from the digital image header itself using Exif or JPEG tags, for example.

Still further, description (514) of the images (504) provided by the poster of the image (504) may also be added to the social networking environment (500). This information, may, in turn, be added to the physical representation as printed descriptions (614). A date (515) the description was added to the social networking environment (500) may also be printed as a description date (615) to provide context as to when the image (504) was posted on the social networking environment (500). In FIGS. 5 and 6, the description details when the picture was taken both via the description date (615) and the prose of the description, and also indicates who took the picture (i.e., the user's roommate at the time), and at what event (i.e., a first visit to the Eiffel Tower).

Even still further, the tags (516) associated with the images (504) of the social networking environment (500) may also be presented within the physical representation (600). As depicted in FIG. 5, once a cursor is, for example, hovered above an object or person within the image, if that object or image has been tagged or identified, a callout appears in the form a tag (516) within the social networking environment (500). This tag can be portrayed within the physical representation (600) as a printed tag (616). In both FIGS. 5 and 6, the tag provides the viewer of the social networking environment (500) and physical representation (600), respectively, with what the object is or who the person is in the form of an indicator. For example, the person within the image (504, 604) is "Jane Smith" and the tag (516, 616) conveys this information.

In one example, a number of square-frame subject tag markers that mark an individual object or person within the digital image (504) may be extracted from the social networking environment (500). Once the markers are obtained, the individual portions of the digital image (504) that represent the object or person tagged may be presented within the physical representation (600) as separate images with captions that indicate what the object is or who the person is. In another example, the identity of the individual objects and/or people within the digital image (504) may be automatically determined via a facial recognition method. In this example, facial recognition software such as, for example, iPhoto™ developed and distributed by Apple, Inc. may be used to determine the identity of the objects and/or persons within the digital image (504). Also, in this example, a user can determine which identified object or person to include within the physical representation (600).

These comments (508, 608), captions (512, 612), descriptions (514, 614), tags (516, 616), and other data associated with the digital images are helpful to a reader of the physical representation (600) in many ways. By including this additional printed matter, the reader may be able to more fully understand the characters or things within the image (604), the reason the image (604) was captured and/or printed in the physical representation (600), any stories behind the image (604).

The physical representation (600) may comprise digital images retrieved from a number of photo albums within the social networking environment (500). In one example where different photo albums within the social networking environment (500) are separately represented within the physical representation (600) the information associated with each of the photo albums may be extracted from the album details existing within the social networking environment (500). For example, to obtain a title of the album, the present system may extract the social networking environment's (500) album name. Similarly, to obtain dates of the album, the present system may extract the dates of the digital images within the album and create a range of dates. In this example, the date "August 2008" may indicate that all digital images (504, 604) were captured or posted on different days in month of August 2008. Further, the date range "1969-1971" may indicate that all digital images (504, 604) were captured or posted in different months of the years 1969 through 1971. Still further, the date "Feb. 8-18, 2004" may indicate that all digital images were captured or posted between Feb. 8, 2004 through Feb. 18, 2004.

To obtain location where the digital images (504, 604) were captured album, the present system may extract common location keywords from album name and/or digital image (504, 604) captions to annotate a keyword-based suggestion. For example, if the present system detects "Miami," "Naples," and "West Palm Beach" as being associated with digital images (504, 604), the system could suggest "Florida" as location. If multiple states are determined by keyword, then the states are listed in order originally presented within the social networking environment's (500) album such as, for example, "Florida, Georgia & Alabama."

Although only two pages (652, 654) are depicted as begin the extent of the physical representation (600) within FIG. 6, any number of pages may be included in the physical representation (600). A user may be allowed to choose a particular size of medium on which the information from the social networking environment (500) is printed to create the physical representation (600). Some examples of sizes of medium include 4×6, 5×7, 8×10, 10×13, among other sizes. In one example, a number of additional pages with or without the same proportions as pages (652, 654) may be added to the pages (652, 654) to create a multi-paneled page.

The physical representation (600) may comprise various layouts and information. For example, depending on whether the original photo is printed on the physical representation (600) vertically (i.e., portrait) layout or horizontal (i.e., landscape) layout, the user can choose to attach the second sheet along the long edge or short edge of original photo. Further, the layout may be such that a reader flips to the right or towards bottom of pages (652, 654) depending on user's preference.

Further, a thin strip of adhesive may be applied to an edge being attached to a page in order to create a binding spine to original pages. The adhesive can be chosen as a relatively permanent and strong adhesive or as a relatively non-permanent removable adhesive that allows for additional pages to be updated with new pages with new comments over time.

In one example, the physical representation (600) may be presented with a number of tabs (656) that can be used to separate different subject matter. As depicted in FIG. 6, the tab (656) indicates to a reader that the page or pages are associated with "Paris." This may prove helpful to a reader in understanding the flow of information within the physical representation (600), and provide quick access to information surrounding a particular event or person, for example. Further, in another example, the tabs (656) may have curved edges to provide a more aesthetic look or support a "tabbed" look and feel for ease of sorting.

Also, a number of elements (658) not provided within the social networking environment (500) may be added to the physical representation (600) to add context to the physical representation (600). For example, additional comments, captions, descriptions, tags, images, and other data associated with the digital images, but not included within the social networking environment (500) may be added to the physical representation (600). In the example of FIG. 6, a number of images are added to the physical representation (600).

During creation of the physical representation (600), a user may be allowed to add these additional comments, captions, descriptions, tags, images, and other data associated with the digital images, but not included within the social networking environment (500). Further, the user may be allowed to change backgrounds, colors, and other visual aspects of the layout of the physical representation (600) during creation of the physical representation (600).

Thus, in one example, the physical representation (600) may comprise information added to and found within social networking environment (500) that has been collected over a long period of time. In another example, the physical representation (600) may comprise information added to and found within social networking environment (500) that has been collected from a single event such as, for example, a wedding. In one example, a user may invite a number of persons to contribute digital images (504) and comments (508), captions (512), descriptions (514), tags (516), and other data associated with the digital images (504) to the social networking environment (500) in anticipation of producing a physical representation (600) associated with a particular subject or event. For example, in the context of a wedding or family reunion to be held in the near future, the user may invite other people to contribute digital images of family members, tag family members within the digital images to identify those individuals, indicate their familial status, comment on images associated with the wedding or family reunion, etc. In this manner, the physical representation (600) can become an even more meaningful keepsake to those who obtain a copy.

In one example, the user or users of the present systems and methods may be charged by an entity for use of software that performs the above functions, and printing of the content to produce the physical representation (600), among other actions for which a service is rendered.

The present system and method creating a physical representation (600) of digital information located on a social networking environment (500) provides a choice for those users who want to preserve the media content outside of the on-line medium, as a backup or as a way to enjoy their collection off-line. Further, the physical representation (600) may be created in conjunction with a special event such as a wedding, a family reunion, a holiday trip, a birthday, among many others. In this example, the special occasion may be presented in the form of the physical representation (600) as a keepsake. Further, the physical representation (600) of the social networking environment (500) may allow individuals who don't have access to the social networking environment (500) to enjoy not just the images contained within the social networking environment (500), but also the comments (508, 608), captions (512, 612), descriptions (514, 614), tags (516, 616), and other data associated with the digital images as well.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a number of computer readable medium(s) having computer readable program code embodied thereon.

Any combination of a number of computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having a number of wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present system may be written in any combination of a number of programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to examples of the present system. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present system. In this regard, each block in the flowchart or block diagrams may represent a module, segment, or portion of code, which comprises a number of executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of creating a physical representation of digital information located on a social networking environment comprising, with a processor:
    prior to a specific event, sending an invitation to a plurality of users to contribute a number of digital images and data associated with the digital images to the social networking environment, the plurality of users being associated with the specific event;
    retrieving the digital images from the social networking environment, the images comprising images associated with the specific event;
    retrieving the data associated with the retrieved digital images; and
    creating a physical representation of the digital images and data associated with the digital images,
    wherein the data associated with the digital images comprises a number of comments and a number of tags within the digital images, the tags identifying an individual within the digital images;
    wherein creating the physical representation of the digital images and data associated with the digital images comprises adding an index marker to the physical representation, the index marker identifying which of a number of photo albums within the social networking environment the images originate.

2. The method of claim 1, further comprising customizing a number of parameters of the physical representation of the digital images and data associated with the digital images.

3. The method of claim 2, in which customizing a number of parameters of the physical representation of the digital images and data associated with the digital images comprises customizing the layout of the physical representation of the data associated with the digital images with respect to the physical representation of the digital images, specifying which data associated with the digital images is physically represented, or combinations thereof.

4. The method of claim 1, further comprising charging a user for retrieving a number of digital images from the social networking environment, retrieving data associated with the digital images, and creating a physical representation of the digital images and data associated with the digital images.

5. The method of claim 1, in which the data associated with the digital images further comprises a number of captions, a number of descriptions of the digital images, the subject of the digital images, or combinations thereof.

6. The method of claim 1, further comprising editing the data associated with the digital images.

7. The method of claim 1, in which the method is performed without altering the digital information located on the social networking environment.

8. The method of claim 1, in which creating a physical representation of the digital images and data associated with the digital images comprises creating a hardcopy album comprising a plurality of digital images and data associated with the plurality of digital images.

9. The method of claim 1, in which the data associated with the digital images is filtered by type.

10. The method of claim 1, in which inviting a number of users to contribute the data associated with the digital images on the social networking environment comprises inviting a number of users to contribute data not included within the social networking environment.

11. The method of claim 1, further comprising receiving user-selection of a number of instances of the data associated with the digital images.

12. The method of claim 11, wherein the user-selection of the number of instances of the data associated with the digital images comprises comments related to a specific group within the social networking environment.

13. The method of claim 1, further comprising:
receiving instructions to edit the retrieved data associated with the digital images; and
editing the retrieved data associated with the digital images based on the received instructions.

14. The method of claim 1, wherein creating the physical representation of the digital images and data associated with the digital images comprises receiving instructions from a user to change a type and a size of a font of text elements within the physical representation, the type and size of the font of the text elements being different from a font presented within the social networking environment.

15. The method of claim 1, wherein creating the physical representation of the digital images and data associated with the digital images comprises adding a caption to the images, the caption comprising a title derived from a filed within the social networking environment.

16. The method of claim 1, wherein creating the physical representation of the digital images and data associated with the digital images comprises receiving instructions from a user to add a number of elements not within the social networking environment to the physical representation.

17. A method of creating a photo album, comprising, with a processor:
sending an invitation to a plurality of users to contribute a number of digital images and data associated with the digital images to a social networking environment;
retrieving data associated with a number of the digital images located on the social networking environment, the data associated with the digital images comprising a number of comments and a number of tags within the digital images, the tags identifying an individual within the digital images;
receiving user-selection of a number of instances of the data associated with the digital images comprising comments related to a specific sub-group of individuals that have contributed to the data associated with the digital images within the social networking environment;
receiving instructions to edit the retrieved data associated with the digital images;
editing the retrieved data associated with the digital images based on the received instructions; and
creating a photo album comprising the digital images and data associated with the digital images comprising adding an index marker to the physical representation, the index marker identifying which of a number of photo albums within the social networking environment the images originate.

18. The method of claim 17, in which the data associated with the digital images further comprises information about subject matter of the digital images.

19. The method of claim 17, in which the data associated with the digital images further comprises a number of captions, a number of descriptions of the digital images, the subject of the digital images, or combinations thereof.

20. A method of creating a physical photo album from a social networking environment comprising:
retrieving a number of digital images, a number of comments associated with the digital images, and a number of tags identifying individuals within the digital images from the social networking environment;
creating a physical representation of the digital images, comments, and tags comprising; and
adding an index marker to the physical representation, the index marker identifying which of a number of photo albums within the social networking environment the images originate.

* * * * *